No. 713,532. Patented Nov. 11, 1902.
W. G. TEMPLETON.
CHEESE CUTTER.
(Application filed Sept. 24, 1901.)
(No Model.)
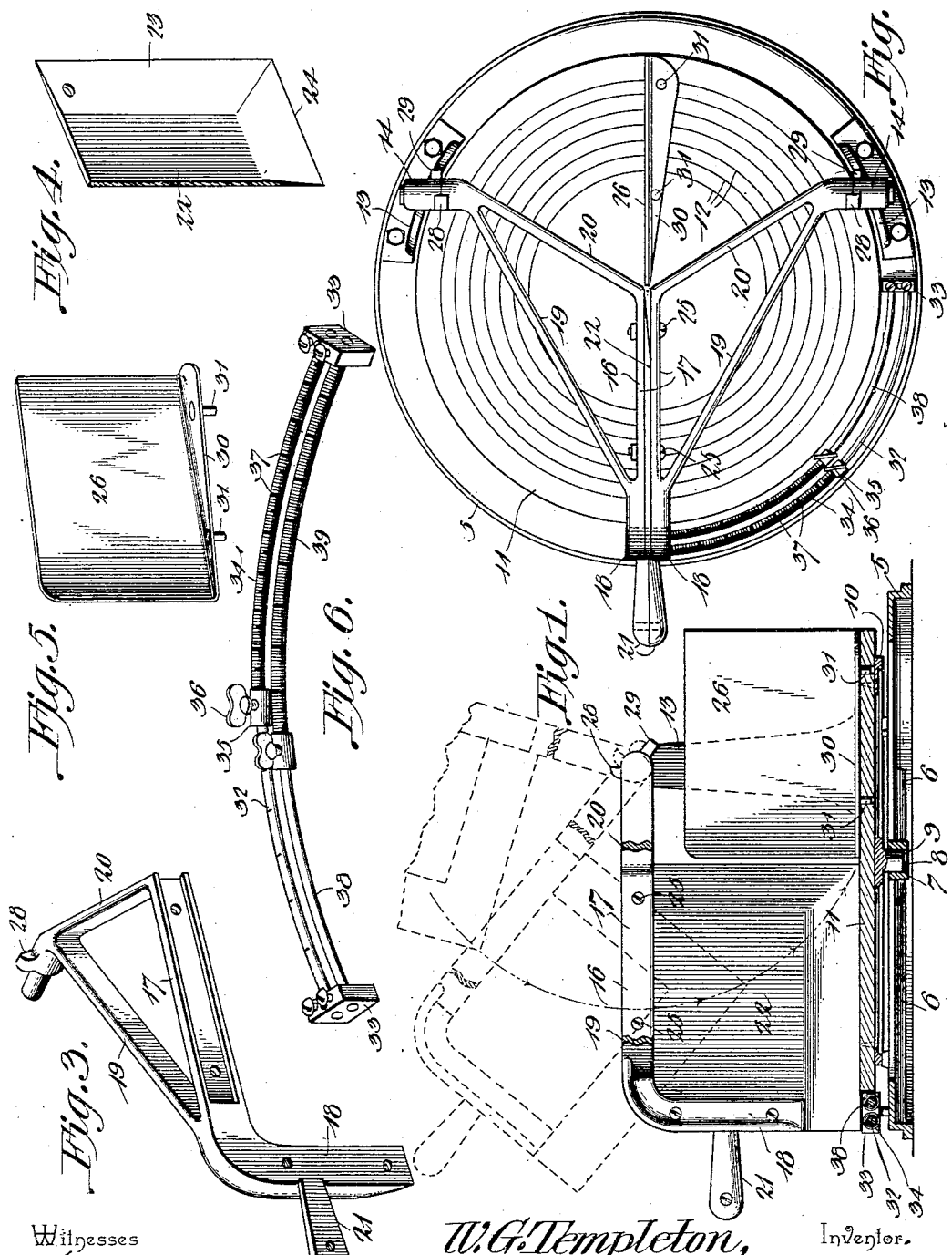
Witnesses
W. G. Templeton, Inventor.
by C. A. Snow & Co.
Attorneys

UNITED STATES PATENT OFFICE.

WILLIAM G. TEMPLETON, OF COLORADO SPRINGS, COLORADO.

CHEESE-CUTTER.

SPECIFICATION forming part of Letters Patent No. 713,532, dated November 11, 1902.

Application filed September 24, 1901. Serial No. 76,385. (No model.)

*To all whom it may concern:*

Be it known that I, WILLIAM G. TEMPLETON, a citizen of the United States, residing at Colorado Springs, in the county of El Paso and State of Colorado, have invented a new and useful Cheese-Cutter, of which the following is a specification.

My invention relates to certain improvements in cheese-cutters, and has for its principal object to construct a machine which will make a sharp clean accurate cut with the exercise of a minimum force.

A further object of the invention is to provide an improved form of cutting-knife and knife-holding frame which will hold the knife rigid during the cutting operation, so that the knife will be securely held in a fixed vertical plane while cutting.

A further object is to so construct the device as to fully protect the cut surfaces of the cheese from exposure to the air without the employment of the usual covering devices.

A still further object of the invention is to provide an improved form of cutting-gage which may be readily adjusted in accordance with the weight of the cheese being cut and in accordance with any variation which may be made in price.

With these and other objects in view the invention consists in the novel construction and combination of parts hereinafter described, illustrated in the accompanying drawings, and particularly pointed out in the appended claims.

In the drawings, Figure 1 is an elevation of a cheese-cutter constructed and arranged in accordance with my invention. Fig. 2 is a plan view of the same. Fig. 3 is a detail perspective view of a portion of the knife-carrying frame. Fig. 4 is a sectional perspective view of the cutting-knife detached. Fig. 5 is a similar view of the guard and follower which I employ to protect the end of the cheese where the first cut is made. Fig. 6 is a perspective view of the cutting-gage detached.

Similar numerals of reference are employed to indicate corresponding parts in the various figures of the drawings.

5 designates a base-ring having a series of radial arms 6 extending from a centrally-disposed hub 7, in which is formed a suitable opening 8 for the reception of the pivot-pin 9 of a spoked ring 10. Secured to the ring 10 is a cutting-board 11, formed of wood or some similar material which will permit of the cutting through of the cheese without injury to the knife. The upper surface of the board is provided with a series of concentric circles 12, which may be scored or otherwise marked on its surface to assist in centering cheese of different diameter.

At suitable points on the base-ring 5 are standards 13, provided at their upper ends with sockets 14 for the reception of the pintles of a knife-carrying frame 16, the latter being made of two similarly-shaped sections, between which the knife is secured. Each section of the frame comprises a substantially horizontal bar 17, a vertical bar 18, and two angularly-disposed bars 19 and 20, the pivoting-pintle being arranged at the juncture of the two arms 19 and 20. On each of the arms 18 is a half-handle 21, said handle and all of the portions of each section of the frame being formed integral. The knife 22 is rectangular in contour and has one flat side for contact with the body of the cheese, so that after a cutting operation such flat surface will be in intimate contact with the cut portion of the machine and prevent its exposure to the air. At the opposite side of the knife-blade the lower and inner vertical edges are ground down, as shown more clearly in Fig. 4, to provide cutting edges 23 and 24. The knife is clamped between the frame-sections by a series of securing-screws 25, the horizontal and vertical members of the frame-sections insuring the rigidity of the knife-blade. When the two sections of the frame are connected, one or more securing-screws are passed through the handle-sections 21 to form a complete handle.

After the first sector has been cut from the cheese a follower-plate 26 is placed against the cut surface in order to protect the same from air, and as the knife completely covers the opposite cut portion the cheese is fully protected without the necessity of employing the usual covers.

It will be noted that the plane in which the pivoting-pintles of the knife-carrying frame are placed is slightly to one side of the vertical center of the cheese and at a point within the peripheral line of the cheese, the result being that the cutting-knife will produce or effect a sharper cleaner cut and with the expenditure of less force than in devices of the class hitherto employed. By reference to Fig. 1 it will be seen that the point of the knife at the juncture of the cutting edges 23 and 24 will first enter the cheese at a point about midway between its center and circumference, and from thence the point will travel in the plane indicated by dotted lines on a line concentric with the center of the pivots. The resultant cut will be made in opposite directions from the point by the respective cutting edges, the force exerted being substantially the same in both directions, so that there will be no tendency to shift or alter the position of the cheese being cut. The cutting action, moreover, is such as to prevent the cheese from crumbling, and the rigidity of the frame, owing to its widely-separated pivot-points, and the rigidity of the knife, due to the clamping of its outer and upper edges between the frame members, will insure the travel of the knife in a fixed vertical plane, there being no yielding movement in the direction of least resistance represented by the sector being cut from the cheese.

During the time a new cheese is being placed in position on the cutting-board or during a rotative movement of the board to move a sector past the cutting-knife the knife-carrying frame may be thrown back to the position shown by dotted lines in Fig. 1, suitable stops 28, carried by the knife-frame, engaging with stop-shoulders 29 on the standards 13. The follower-plate 26 is provided, as shown in Fig. 5, with a base-flange 30, from which depend pins 31, adapted to suitable openings in the base-board 11 and forms an anchor for preventing movement of the cheese during cutting. It also serves to positively transmit the rotative movement of the cutting-board to the cheese when turning to make a new cut. The construction of the follower may be simplified by forming it without the base-flange, the vertical plate being provided with suitable strengthening bars or ribs extending vertically along one face thereof and terminating in depending pins adapted to the openings in the cutting-board.

The machine as constructed cuts so accurately that any weighing may be dispensed with, a suitable gage being employed to measure the size of the sector to be cut, the gage being adjustable, so that a sector having a known weight may be measured and cut. A suitable gage for this purpose is illustrated in Figs. 2 and 6 and comprises a curved bar or quadrant 32, secured at its opposite ends in suitable blocks 33, fastened to the ring 5, one of such blocks being in vertical alinement with the cutting-blade. On the bar 32 is placed a helical tension-spring 34 of a length when at rest equal to one-half of the length of the bar or to one-eighth of a complete circle drawn on the same radius as the bar 32. One end of the spring is secured to the bar 32 at a point close to one of the end blocks 33 in the vertical plane of the cutting-knife, and the opposite end of the spring is secured to a collar 35, carried by the bar and adjustable thereon, the collar being provided with a suitable thumb-screw 36, by which it may be locked in any position on said bar. The spring is provided with suitable designating-marks 37, which may be formed by suitably coloring portions of the spring at equidistant points or may be formed by small plates, blocks, or spurs secured to the spring at equidistant points throughout its length. In a cheese of given weight a sector of a given size will possess a known weight, and the spring 34 may be stretched along the bar to separate its designating-marks to any desired extent, dependent upon the weight of the cheese being cut, the bar being provided with suitable indicating-marks, as shown, to represent cheese of different weights. The collar being adjusted to the proper mark on the bar will expand or contract the spring to increase or decrease the distance between its designating-marks. In similar manner provision is made for a price-gage, which may be adjusted in accordance with adjustment of the weight-gage and in accordance with the value per pound of the article being sold. For this purpose a second bar 38 is placed parallel with the bar 32, its ends being secured to the blocks 33, and on said second bar is placed a spring 39, provided with designating-marks to represent money values. This spring is so arranged that each coil or turn of the wire will represent a unit of value, one complete turn of the wire representing, for instance, one cent; three turns, three cents, and so on throughout the entire length of the spring. In adjusting this spring a sufficient number of the turns of the spring are placed within the space inclosed by a division of the spring 34 representing one pound to indicate the price per pound. In other words, if the value be seventeen cents per pound the seventeenth turn of the spring will be placed opposite the mark 37 of the spring 34, which represents one pound. The spring will automatically adjust itself, so that the thirty-fourth turn will be opposite the two-pound mark and the fifty-first turn opposite the three-pound mark. In this manner the total value of the piece cut is immediately indicated.

Instead of using a single turn of the wire to indicate a unit value, two or more turns may be used, or the spring may be provided with designating-marks arranged in any desired manner to represent unit values or divisions thereof.

While the construction herein described, and illustrated in the accompanying drawings, is the preferred form of the device, it is obvious that changes in the form, proportions, size, and minor details of construction may be made without departing from the scope or sacrificing any of the advantages of the invention.

Having thus described my invention, what I claim is—

1. In a device of the class specified, a rectangular cutting-knife having a horizontal and a vertical cutting edge formed by beveling two edges of the knife on one side only, the opposite side of said knife presenting a perfectly-smooth flat surface or plate adapted to protect the freshly-cut surface of the cheese, a handled supporting-frame for said knife, said frame being pivotally mounted in a horizontal plane above the level of the cheese, and in a vertical plane between the center and outer edge of the cutting-board, the handle and pivotal points of the frame being disposed on opposite sides of the center of the cutting-board.

2. In a device of the class specified, a rectangular knife having vertical and horizontal cutting edges and adapted for swinging movement, and a knife-carrying frame comprising a braced structure having widely-separated pivot-points arranged in a vertical plane between the center and the outer edge of the cutting-board, the point of said knife being adapted to enter the top of the cheese at a point on the opposite side of the center of the cutting-board from that in which the pivot-points of the frame are disposed, substantially as specified.

3. In a device of the class specified, a rectangular knife, a two-part frame having members extending along and bracing the whole of the upper edge of the knife and the major portion of the outer edge thereof, devices for securing the two parts of the frame together and for clamping the knife between them, and a pivotal support for said knife, substantially as specified.

4. In a device of the class specified, a base-frame, standards carried thereby, a trussed frame formed in two sections and pivoted in said standards, and a rectangular knife having its upper and outer edges rigidly secured between the two parts of said frame.

5. In a device of the class specified, a base, pivot-standards carried thereby, a rectangular cutting-knife having its lower and inner edges sharpened to form cutting edges, a two-part frame having vertical and horizontal members extending throughout the length of the blade and secured to its top and its outer sides, said frame being pivoted in the standards and being provided with diagonal bracing-bars extending from points near the outer edge of the knife to the pivot-points of the frame, substantially as specified.

6. In a cheese-cutter, a base, pivot-standards carried thereby, a knife-frame formed of two mating sections each having vertical and horizontal members and integral angularly-disposed arms or bars, a handle portion formed integral with the vertical member, a knife having its upper and outer edges adapted to be embraced by the vertical and horizontal members of the frame-sections, and means for securing the knife and the sections, substantially as described.

7. In a cheese-cutter, the combination with the cutting-knife, of a follower adapted to cover and protect the cut surface of the cheese, said follower having a base-flange secured to and supported by the cutting-board of the device, substantially as specified.

8. In a cheese-cutter, the combination with the cutting-knife, of a follower-plate having a base-flange, and holding-pins depending from said flange and adapted to suitable openings in the cutting-board, substantially as specified.

9. In a device of the class specified, the combination with the cutting-knife, of a cutting-board, and a follower-plate removably secured thereto and adapted to bear against the cut surface of the cheese to assist in transmitting the rotative movement of the board to the cheese.

10. In a device of the class specified, a rectangular blade having vertical and horizontal cutting edges, a two-part frame to which said knife is secured, supporting-standards to which the frame is pivotally connected, said standards being disposed in a plane between the vertical center and the outer edge of the cutting-board, and the pivoting-standards being widely separated to hold said blade from vibratory movement.

11. In a device of the class specified, the combination of the base-ring, a blade having horizontal and vertical cutting edges, a rigid braced frame carrying said knife and embracing the upper and outer edges thereof, pivoting-standards carried by the base-ring at points beyond the peripheral line of the cutting-board but in a vertical plane between the center and the outer edge of said cutting-board.

12. In a device of the class specified, a combined cutting-blade and shield one side thereof being perfectly flat and smooth and adapted for close contact with the cheese to prevent its exposure to the atmosphere, the opposite side of said blade being beveled along two of its edges to form cutting edges, substantially as specified.

13. In a device of the class specified, a combined cutting-blade and shield comprising a blade having one flat face for contact with the body of the cheese, the opposite side of said blade being beveled to form inner and lower cutting edges.

In testimony that I claim the foregoing as my own I have hereto affixed my signature in the presence of two witnesses.

WILLIAM G. TEMPLETON.

Witnesses:
C. E. DOYLE,
FRANK S. APPLEMAN.